I. B. GATHRIGHT.
HOSE COUPLING.
APPLICATION FILED OCT. 18, 1917.
1,269,924. Patented June 18, 1918.
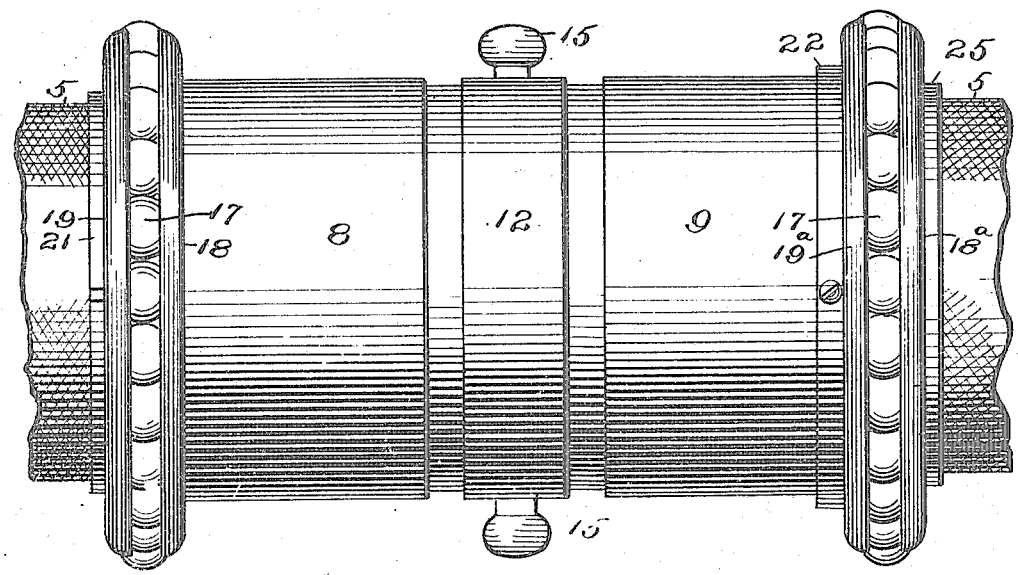
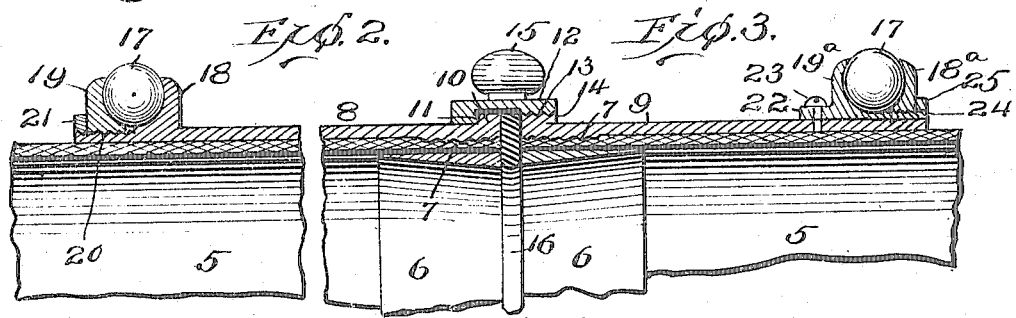
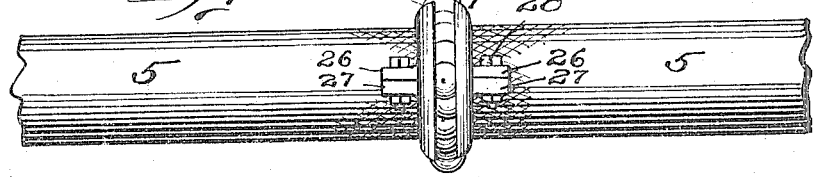
Inventor
Josiah B. Gathright
By C. J. Stockman
Attorney

UNITED STATES PATENT OFFICE.

JOSIAH BAKER GATHRIGHT, OF LOUISVILLE, KENTUCKY.

HOSE-COUPLING.

1,269,924.     Specification of Letters Patent.     Patented June 18, 1918.

Application filed October 18, 1917. Serial No. 197,228.

*To all whom it may concern:*

Be it known that I, JOSIAH BAKER GATHRIGHT, a citizen of the United States, residing at Louisville, in the county of Jefferson and State of Kentucky, have invented certain new and useful Improvements in Hose-Couplings, of which the following is a specification.

This invention has for its object the provision of a rolling mounting for hose and particularly for fire hose. It is well-known that fire hose when filled with water under pressure is so heavy and stiff that it is extremely difficult to handle. The saving of time is extremely important in fighting fire since a few minutes' delay in laying the hose for action may permit the fire to gain such headway as to put it beyond control.

It is apparent that the time necessary to lay the hose for action may be reduced by reducing to a minimum the labor incident to that end. With this result in view, the present invention contemplates the provision of simple and efficient means whereby a rolling contact may be had between the hose and the surface upon which the hose rests whether the point of contact be at the bottom or the side of the hose; the construction being such that the hose will be freely movable both laterally and longitudinally, the elements which provide such rolling contact being of such nature that they will not interfere with the reeling or folding of the hose for storage upon hose reels or hose wagons.

Further objects and advantages of the invention will be set forth in the detailed description which now follows:

In the accompanying drawing:

Figure 1 is a side elevation of a hose coupling having the invention applied thereto;

Fig. 2 is a sectional view illustrating the invention incorporated as a part of the hose coupling;

Fig. 3 illustrates a slightly modified form of the invention in which all of the parts thereof are formed separate from the hose coupling proper; and Fig. 4 is a detail view illustrating one of my improved couplings located in the length of a section of hose.

Fire hose of the type commonly employed comprises fabric sections 5, the ends of which are clamped by expansion rings 6 into corrugations 7 formed in the inner faces of sleeves 8 and 9. The sleeve 8 is provided with a collar 10 against which a shoulder 11 of a ring 12 has a seating. This ring is internally threaded at 13 to engage with an externally threaded collar 14 of the sleeve 9. The ring 12 is provided with studs 15 which constitute hand grasps or members to which a spanner wrench may be applied to turn the ring with relation to the sleeves 8 and 9, to thereby compress a gasket 16 between the collars 10 and 14 to secure a water-tight joint.

So far the parts described are all of the usual and well-known construction, the present invention particularly residing in applying to the hose coupling or other part of the hose, a member or members which will present rolling surfaces extending entirely around the circumference of the hose and which members at every point of contact of the hose with extraneous objects will be capable of universal rolling movement to permit a universal movement of the hose with respect to such extraneous objects.

In securing this result I preferably employ a plurality of steel balls 17 disposed in suitable races, the members constituting said races being secured to the hose, and preferably to the coupling forming a part thereof, in any suitable way. In Fig. 2, for example, one side of the race indicated at 18 is illustrated as being integral with the sleeve 8 of the coupling, and the other side 19 of the race is threaded upon the sleeve 18 at 20. A lock nut 21 serves to bind the side 19 in its adjusted position.

While the structure illustrated in Fig. 2 will efficiently serve the purposes sought, it may be preferred to provide means whereby the several parts may be mounted upon the hose coupling without any change in the construction of the latter and while this may be accomplished in many different ways without departing from the spirit of the invention, I have illustrated in Fig. 3 a very desirable construction for the purpose. In this case the side 19$^a$ of the ball race is provided with a collar 22 which may be secured by a set screw 23 or by sweating, or otherwise, to the sleeve 9 and the side 19$^a$ is provided with a sleeve extension 24 that is externally threaded for the reception of the side 18$^a$ of the race and also threaded for the reception of a lock nut 25 by which the side 18ª of the race may be bound in its adjusted position.

In Fig. 4 the sides of the race indicated at 18ᵇ and 19ᵇ have been illustrated as being each formed in two sections provided with ears 26 and 27 through which bolts 28 may be passed to bind these sections upon the hose section 5 at any point in the length of the latter and intermediate the couplings.

Since it is necessary in actual use to carry fire hose through halls and alleys and around corners it follows that at different times any given section of hose occupies different positions and that a part of the hose that at one time may constitute the top side of the hose may at some other time lie at the bottom of the hose. It will be seen that this is true when it is reflected that the hose may occupy any position with respect to what constitutes its top or bottom, at the time that it is coupled to an adjacent section of hose. In the emergency and haste incident to the use of the hose at fires no time can be wasted in adjusting the mountings upon the hose. Upon the contrary, any device to be of practical use in this relation must be operative at all times irrespective of what part of the hose lies at the top and what part lies at the bottom. Furthermore, the resistance of the movement of the hose does not always arise from its contact with the floor or ground. Frequently, the lines of hose run parallel with each other and their sides contact with each other and since their canvas surfaces are very rough it follows that the friction between them is considerable. The structure herein shown and described will reduce friction at the sides of the hose as well as at the bottom and in addition a rolling contact between the hose and the ground will always be present irrespective of how the hose may become twisted in use or what part of the hose may have constituted the top of the hose at the time of the application of the rolling contact members thereto. It is to be noted that each and every one of these rolling contact members is a member capable of permitting universal movement of the hose with relation to the surface upon which it is supported. In other words, the hose may move laterally, longitudinally or obliquely across the supporting surface. It will also be seen that the races and balls are of such nature that the winding of the hose upon hose reels or the folding of the same when placed in hose wagons is not interfered with. Consequently the said races and balls may be permanently mounted upon the hose and will be found always in place, no time being lost in attaching them after the scene of the fire is reached.

It is to be understood that the embodiment of the invention illustrated and described is merely exemplary. There are many ways in which the invention may be applied to the hose and I do not wish to be understood as restricting the invention to the particular embodiment thereof shown in the accompanying drawing.

Having thus described the invention, what I believe to be new and desire to secure by Letters Patent, and what I therefore claim is:—

1. In a mounting for hose, a plurality of rolling contact members extending entirely around the circumference of the hose and each of which is capable of universal rolling movement with respect to the hose.

2. In a mounting for hose, the combination with a ball race extending entirely around the circumference of the hose and a plurality of hose-supporting freely rotatable balls mounted therein and filling said race, each of which is capable of universal rolling movement.

3. In a mounting for hose, the combination with a hose coupling, of a ball-race supported thereon and extending entirely therearound and a plurality of balls mounted therein and constituting rolling supports which extend around the circumference of the coupling, each of which is capable of universal rolling movement.

4. In a hose support, the combination with a hose coupling, of a ball race at each end thereof and extending entirely therearound and a plurality of balls in each of said ball races which project circumferentially beyond the face of said coupling and each of which constitutes a rolling mounting for said coupling capable of permitting universal movement of said coupling with relation to the surface upon which it rests.

5. In a hose support, the combination with a hose coupling, of a ball race at each end thereof and extending entirely therearound and a plurality of balls in each of said ball races which project circumferentially beyond the face of said coupling and constitute rolling mountings for said coupling capable of permitting universal movement of said coupling with relation to the surface upon which it rests, each of said races comprising a fixed side and a side adjustable toward said fixed side and means for binding the last named side in its adjusted position.

6. The combination with a hose coupling, of a ball race comprising two sides, one of which is adjustable with relation to the other, means for securing one of said sides to the hose coupling and means for binding the other of said sides in its adjusted position.

7. The combination with a hose coupling, of a ball race comprising two sides, one of said sides having a threaded extension upon which the other of said sides is threaded, means for binding the last named side in adjusted position and means for securing the first named side to the hose coupling.

8. The combination with a hose, of a ball race comprising two sides, one of said sides having a threaded extension upon which the other of said sides is threaded and a lock nut threaded upon said extension for binding the last named side in adjusted position.

In testimony whereof I affix my signature in the presence of two witnesses.

JOSIAH BAKER GATHRIGHT.

Witnesses:
   H. K. SOLOMON,
   W. T. BAKER.

Copies of this patent may be obtained for five cents each, by addressing the "Commissioner of Patents, Washington, D. C."